United States Patent Office 3,843,447
Patented Oct. 22, 1974

3,843,447
PHOTOLYTICALLY ACTIVATED COUPLING
TO POLYPEPTIDES
Terry Burkoth, Palo Alto, Calif., assignor to Syva
Company, Palo Alto, Calif.
No Drawing. Filed Sept. 22, 1972, Ser. No. 291,425
Int. Cl. C07g 7/02, 7/00, 15/00
U.S. Cl. 195—68                                    12 Claims

ABSTRACT OF THE DISCLOSURE

A polypeptide, such as an enzyme, and a compound having reactive functional groups are linked together by a process involving first coupling to the polypeptide a substituted aryldiazosulfonate through a reactive substituent other than a diazo group of the aryldiazosulfonate to form a diazosulfonate substituted polypeptide. The diazosulfonate of the substituted polypeptide is then activated with light and the activated diazosulfonate reacted with a functional group of the compound to link the polypeptide and compound together.

BACKGROUND OF THE INVENTION

Field of the invention

In many situations it is desirable to link or couple two different compounds where one or both are polyfunctional. The functionalities need not be the same, where the different functionalities are capable of reacting with the same reagent. For example, both hydroxyl groups and amino groups are capable of reacting with activated carboxylic acid derivatives to form esters and amides respectively, or with isocyanate to form urethanes and ureas, respectively. There is a particularly acute problem with coupling high molecular weight naturally occurring molecules such as proteins and sugars to like or different molecules. Molecules, such as proteins, sugars, and the like will have a plurality of hydroxyl, mercapto or amine functionalities, which are reactive to a wide variety of reagents. Therefore, in any type of reaction, one obtains a relatively random reaction of the functionalities and a complex mixture of products.

Desirably, one would wish to react the first polyfunctional compound to a desired degree to provide a new compound which could then be reacted with the second compound. By controlling the ratio of reactants, one could minimize or preclude self-reaction.

There is also the problem where one wishes to couple a polyfunctional compound with itself without the formation of polymers. Since the polyfunctional compound has a plurality of sites which are reactive to the same reagent, using difunctional types of linking groups inevitably leads to polymerization. Various techniques can be used to minimize polymerization, but these techniques invariably have other undesirable aspects. For example, a large excess of the polyfunctional compound could be used. This would require separation of the product from a large amount of unreacted material, the use of large amounts of the more expensive reactant, and where two different polyfunctional compounds are to be coupled, a low yield of the desired product for a large amount of reactant consumed.

Description of the prior art

Descriptions of linking of two polypeptides, particularly antibodies and enzymes may be found in Avrameas, International Review of Cytology, 27, 349 (1970). Binding of polypeptides, such as enzymes, to polyfunctional supports may be found in Chemical and Engineering News, p. 86, Feb. 15, 1971, in an article by Mosbach, entitled, "Enzymes Bound to Artificial Matrices." See also Photogenerated Reagents for Biological Receptor-Site Labeling, Knowles, Acc. Chem. Res. 6, (3) (1971).

Combining two proteins has found application in an assay for hormones, see U.S. Pat. No. 3,654,090. Antibody-enzyme combinations have been used for developing chromatographs. Various polyfunctional compounds have been bonded to enzymes for immunoassays. Rubenstein, et al., Biochem, and Biophysics Res. Comm. 47 846 (1972).

SUMMARY OF THE INVENTION

The invention concerns combining a first polyfunctional compound or composition with a substituted aryl-*anti*-diazosulfonate so as to substitute the first compound or composition with at least one *anti*-diazosulfonate group, to form an *anti*-diazosulfonate substituted polyfunctional product; combining the *anti*-diazosulfonate substituted polyfunctional compound with a second compound, usually polyfunctional, having at least one functionality susceptible of reacting with a *syn*-diazosulfonate, by causing the light induced isomerization of the *anti*-diazosulfonate (inactive) to the *syn*-diazosulfonate (active).

DESCRIPTION OF THE SPECIFIC EMBODIMENTS

A first polyfunctional compound is employed, which may have one or more different functionalities susceptible of reacting to form a stable link, usually a covalent link. The compound will have at least two reactive groups of the same or different functionalities so that there are at least two sites at which new groups could be introduced. Furthermore, these reactive functionalities will react with at least one common reagent, so that the compound or composition is susceptible of reacting at a plurality of sites and potentially undergoing polymerization with a polyfunctional reagent.

The second compound, normally polyfunctional will have at least one functionality susceptible of reacting with light activated diazo sulfonate (*syn*-diazosulfonate), and may have a plurality of such functionalities such as hydroxyl, mercapto, amino, etc. A primary distinction between the first and second compound or composition is that the second compound or composition must have at least one group susceptible of reacting with a *syn*-diazosulfonate.

The light activated diazosulfonate is capable of reacting with a variety of different functionalities. The most common and convenient functionality, particularly with polypeptides is the amino functionality, where amino includes both primary and secondary amino groups (amino having at least one hydrogen atom bonded to nitrogen). Other functionalities which are reactive toward diazosulfonates include activated aromatic rings, substituted by one or more amino (usually tertiary) or hydroxy groups, reactive heterocyclic five and six membered rings and enols. Groups to which the diazo group may be bonded include phenols, anilines, amines, β-diketo compounds, five membered azaheterocycles, e.g., indoles and imidazoles and the like.

The polyfunctional compounds will for the most part have a molecular weight of at least 125, and may be as high as 10 million molecular weight or more. In most instances, at least one of the polyfunctional compounds will be a lower order or higher order polymer, having at least three recurring units, usually at least six recurring units, and may have recurring units of 500,000 or greater. (For proteins, individual amino acids will be considered recurring units.) Of particular interest are polyamino acids having a molecular weight in the range of about 1,000 to 500,000, more usually in the range of about 2,000 to 200,000. For the most part, these compounds will be the polyaminoacids, either as polypeptides or proteins.

Polypeptides usually encompass from about 2 to 100 amino acid units (usually less than about 12,000 molecular weight). Larger polypeptides are arbitrarily called proteins. Proteins are usually composed of from one to twenty polypeptide chains, called subunits, which are associated by a covalent or a non-covalent bond. Subunits are normally of from about 100 to 300 amino acid groups (approximately 10,000 to 35,000 molecular weight). For the purposes of this invention, polypeptide is intended to include individual polypeptide units, or polypeptides which are subunits of proteins, whether composed solely of polypeptide units, or polypeptide units in combination with other functional groups, such as porphyrin, as in hemoglobin or cytochrome oxidase.

There will be two types of polypeptides of particular interest. The first type will generally be of from about 5,000 to 600,000 molecular weight, more usually from about 10,000 to 200,000 molecular weight, and will be enzymes. Therefore, it will generally be of particular interest to join an enzyme or enzymes to a different polyfunctional compound or composition.

A second class of compounds are a wide variety of polypeptides and proteins other than enzymes. Relatively low molecular weight polypeptides include such antibiotics as tyrocidin and gramicidin; pressor substances, such as angiotensin II, plasmakinins, such as bradykinin; adrenocorticotropic hormone; melanocyte-stimulating hormone; etc.

Other proteins of varying molecular weight include globulins, α-, β-, and γ-globulins, particularly γ-globulins, which are antibodies, albumins, ocular lens proteins, hemocyanins, hemoglobins, histones, prolamins, glutelins, nucleo-proteins, glycoproteins, phosphoproteins, chromoproteins, and lipoproteins.

Besides the polypeptides described above, various synthetic and naturally occurring polymers, both in their natural state, or modified, either as long chains or crosslinked chains may be employed. Of particular interest are those polymers which are used as supports for bonding various naturally occurring molecules to a high molecular weight substrate. Included among such materials are cellulose, amylose, functionalized polystyrene, dextran gels, acrylic polymers, and even filter paper.

Finally, such complex materials may be employed as viruses, cells, and the like.

The linking compound is a substituted aryl-*anti*-diazosulfonate, where the substituent is chosen so as to be capable of reacting with the functionalities present in the first polyfunctional compound or composition. A wide variety of functionalities are compatible with the diazosulfonate. Included among these functionalities are oxocarbonyl; non-oxocarbonyl, particularly as the anhydride, and including sulfur and nitrogen analogs; activated halo compounds such as haloacetamide or acetate, particularly haloacetamide, haloaryl, particularly nitrofluorophenyl, and halomethylalkyl, when the halo group is iodo or bromo; isocyanate, e.g., isothiocyanate; amino; maleimido; etc. These groups are variously reactive with hydroxyl, mercapto, and amino, primary, secondary and tertiary.

The linking compound will normally be of at least six carbon atoms and not more than twenty carbon atoms, more usually from about six to sixteen carbon atoms. The aromatic group which joins the diazosulfonate to the active substituent will have from one to two rings, either fused or non-fused, usually one ring. The rings may be carbocyclic or heterocyclic, having only one heteroatom, such as nitrogen, and will usually be carbocyclic. The aromatic rings will usually have six annular members.

The substituent will be separated from the diazosulfonate by at least two carbon atoms, and generally from three to four carbon atoms, that is, with benzene, the groups will be *meta* or *para*.

The aromatic rings may be benzene, pyridine, naphthalene, and diphenyl.

For the most part, the linking compounds will have the following formula:

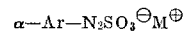

$$\alpha-\text{Ar}-N_2SO_3^{\ominus}M^{\oplus}$$

wherein Ar is an aromatic group of from five to twelve carbon atoms, more usually of from six to ten carbon atoms, and from 0 to one heteroatom, i.e., nitrogen; and α is an active substituent which is capable of forming a stable link to a functionality present in the first polyfunctional compound, wherein the functionality may be bonded directly to an annular member or be separated from an annular member by an aliphatic chain.

Usually, the aromatic ring will be unsubstituted except for the specified functionalities.

The sulfonate will usually have an alkali metal or ammonium, particularly sodium or potassium, counterion as the cation $M^{\oplus}$.

Because of the varied compounds or compositions which may be coupled and the relatively large number of functionalities which are compatible with the diazosulfonate, there is no simple generic statement as to the groups which may be bonded to the aryl group for linking to the first polyfunctional compound. Therefore, α may be varied widely and will normally be of from 1 to 16 atoms (excluding hydrogen), usually having from 1 to 12 atoms (excluding hydrogen). When α is oxocarbonyl, non-oxocarbonyl (including sulfur and nitrogen analogs), activated olefin, or activated halogen, α will usually have from 1 to 10 carbon atoms, more usually 1 to 9 carbon atoms. When α is hydroxy, mercapto, amino, or the like, or aliphatic hydrocarbon substituted with one of these functionalities, α will generally have one to seven atoms (excluding hydrogen). Frequently two or more functionalities will be combined to provide a particular active group. The different functionalities will be categorized under the group which is intended to react or be replaced.

Among oxo-carbonyl groups are formyl, acetyl, α-diketo, and the like.

Among non-oxocarbonyl groups are carboxylic acids, carboxylic acid anhydrides, particularly mixed anhydrides with monoalkyl (1 to 8 carbon atoms) esters of carbonic acid, and esters, e.g., nitrophenyl, imidates, thionocarboxylic acids, thiocarboxylic acids, isocyanates, isothiocyanates and the like.

Among activated olefins are maleimido, 1,1,3,3-tetraoxy-1,3,2-dithiazolinyl-2, and the like.

Among activated halo (atomic number 17 to 53) groups are haloacetamide, haloacetate, halomethylaryl and the like. Bromine and iodine are preferred, particularly iodine.

Compounds which may be employed include the mixed anhydride of monopropylcarbonate and m-carboxyphenyldiazosulfonate, 4' - carboxybiphenyl-4-diazosulfonate, the mixed anhydride of monobutyl carbonate and 4-carboxynaphthalene-1-diazosulfonate, 4-ethoxyimidoylbenzenediazosulfonate,
4-iodoacetamidobenzenediazosulfonate,
4-formylbenzenediazosulfonate,
p-nitrophenyl 4-diazosulfonatobenzoate,
4-isothiocyanatonaphthalene-1-diazosulfonate,
3-maleimidobenzenediazosulfonate,
4-bromomethylbenzenediazosulfonate,
4-mercaptobenzenediazosulfonate,
4-(4'-isothiocyanatobutyl)naphthalene-1-diazosulfonate,
and 4-(3'-nitro-4'-fluorobenzyl)benzenediazosulfonate.

Usually, these compounds will be employed as the alkali metal salts, particularly the sodium and potassium salts.

For the most part, the linking compounds will have the following formula:

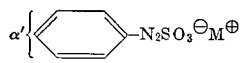

wherein the $\alpha'$ is at the *meta* or *para* position, and is the same as $\alpha$, but is preferably a carboxylic acid, mixed anhydride, imidate, isothiocyanate, maleimide, or haloacetamide; and M is as defined previously.

Usually $\alpha'$ will be of from 1 to 6 carbon atoms and from 2 to 5 heteroatoms, (O, N, S and halo, particularly O and N). The oxygen atoms will usually be present as part of the non-oxo carbonyl functionality or as an oxy functionality, particularly an ether group. The nitrogen functionality will usually be present as an imine, amide or isocyanate. The group will be aliphatic or cycloaliphatic, normally free of aliphatic unsaturation.

Preferred compounds have the following formula:

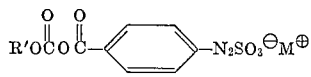

wherein R' is hydrocarbyl, usually alkyl of from 1 to 8 carbon atoms, more usually of from 1 to 6 carbon atoms; and $M^+$ has been defined previously.

While various mixed anhydrides may be used for the non-oxo carbonyl functionality, the preferred mixed anhydride is the alkyl carbonate.

When two polyfunctional compounds are to be linked, there will be a plurality of one of the polyfunctional compounds, as compared with the other polyfunctional compound. Where both of the polyfunctional compounds have appropriately reactive functionalities, one can choose as to which one of the two polyfunctional compounds or compositions will be multiply substituted on the other.

The reaction conditions for the first step of the subject process may be varied widely, depending on the nature and composition of the first polyfunctional compound; the functionalities which are to be the sites for reaction on the polyfunctional compound; the particular reactive substituent on the coupling compound; and in many instances, the desired degree of substitution. That is, as the reaction proceeds, there may be diminishing degrees of reactivity of the functionalities on the polyfunctional compound.

Generally, relatively mild conditions will be employed, usually having temperatures in the range of $-10°$ to $100°$ C., more usually from about $-5°$ to about $50°$ C. Polar solvents will usually be employed which are inert, or are substantially less reactive than the functionalities on the polyfunctional compound. Various polar solvents include: water, alkanols of from 1 to 3 carbon atoms, ethers and polyethers of from 3 to 10 carbon atoms, ketones, dimethylformamide, dimethylsulfoxide, hexamethylphosphoramide, and the like, either by themselves, or in combination.

Concentrations are not meaningful, except as to a specific reaction. Usually the number of active functional groups will be about $10^{-6}$ to $10^{-1}$ M., and the number of linking groups which are to be attached to the first polyfunctional compound will be about $10^{-5}$ to 1 M. The reactants may be present in total amounts in from about $10^{-3}$ to 75 weight percent of the total reaction mixture, more usually from about $10^{-2}$ to 50 weight percent of the total reaction mixture.

The type of functionalities employed are commonly available and have found wide spread use in bonding to hydroxy, mercapto, amino and like groups. The conditions therefore are conventional and may be found in a number of texts.

The second compound may now be combined with the diazosulfonate substituted first polyfunctional compound in a clear solution. Usually, there will be at least about 0.05 moles of the second polyfunctional compound or composition per diazosulfonate, more usually 0.2 moles, and there may be as high as 10 or more moles of the second polyfunctional compound or composition per diazosulfonate group. Where polymerization is to be avoided, it will usually be desirable to have a large excess of the second polyfunctional compound, having at least two moles per diazosulfonate group, more usually at least about four moles.

The same solvents which were described above may be used, for linking to the second polyfunctional compound, although aqueous solvents will usually be preferred. The solvent will normally not absorb light of the desired wavelengths to any significant degree.

The reaction is carried out in solution by combining the reactants and irradiating the solution with light of the desired wavelength. Relatively long wavelength light will be used, normally light of wavelengths substantially in excess of 350 nm., usually at least 380 nm., and normally not exceeding 500 nm. By use of filters, the minimum wavelength can be controlled. It is desirable to maintain a relatively low concentration of the light activated diazosulfonate, which minimizes undesirable side reactions. Therefore, relatively weak light sources can be used. Light of relatively low wavelengths will normally be avoided, since such light is not necessary for carrying out the reaction and may have deleterious effects on one or both of the polyfunctional compounds.

The amount of light will usually be such that the instantaneous concentration of active diazo groups will be less than about 5%, usually less than about 2% of the total number of diazo groups available for reaction, at least in the initial portions of the reactions ($<50\%$).

The weight percent of the total reactants of the reaction mixture will usually be at least 0.001 weight percent, and usually not more than about 50 weight percent, more usually from about 0.01 weight percent, to about 10 weight percent.

The temperature for the reaction will be at least $-10°$ and usually not exceed about $75°$, more usually it will be in the range of about $0°$ to $45°$ C. The time for the reaction will vary widely depending on the particular functional groups present, the reactivity of the functional groups, the concentrations of the various reactants, the number of quanta introduced into the solution, etc. Normally, the reaction will run from about a few minutes to a number of hours.

At the end of the reaction, the excess of the second compound may be separated from the linked first and second compounds or compositions and the product used as desired.

The following examples are offered by way of illustration and not by way of limitation.

(All temperatures not reported are intended to be centigrade.)

EXAMPLE I

To a suspension of 4.1 g. (30 mmoles) of p-aminobenzoic acid in 300 cc. of water was added 4.5 cc. of concentrated hydrochloric acid. The suspension was warmed slightly to hasten solution, at which time an addition 9 cc. of concentrated hydrochloric acid was added and the solution cooled to 0–5°. To this stirring solution was added at once a precooled solution of 2.1 g. of sodium nitrite in 6 cc. of water. After 15 minutes at 0° a test with starch iodide paper indicated excess nitrous acid. The pH was raised to the pH range of Congo red by the addition of saturated aqueous sodium acetate. To this solution was added at once 6.3 g. of sodium sulfite in 15 cc. of water. A certain amount of color was produced at this step and some precipitation was observed as well. The solution could be assayed for active diazonium salt or the reactive *syn* isomer, (1) by touching a drop to filter paper which had been treated with β-naphthol in aqueous alcoholic carbonate solution. An instantaneous red color signaled the presence of the reactive species. After one hour at room temperature, this spot test showed no active diazonium species remaining. The aqueous solution was treated with decolorizing charcoal and filtered. The addition of solid sodium chloride to saturation caused the precipitation of the desired *anti*-diazosulfonate as a yellow crystalline solid which is shown by spectroscopic techniques to be the monohydrate.

EXAMPLE II

To an ice-cold suspension of 500 mg. of the acid-diazosulfonate monohydrate (Example I) in 10 cc. of dry dimethylformamide was added by syringe 1 cc. of isobutyl chloroformate followed by 1 cc. of triethylamine. The mixture was stirred for 3 hours at 0° under nitrogen, then sealed and placed in a refrigerator at 5° for 12 hours. During this time the amount of undissolved material decreased significantly but a crystalline solid remained. The reaction mixture was stirred at 40° and 1 mm. Hg to remove about 5 ml. of clear liquid, which contains some dimethylformamide and the excess isobutyl chloroformate. The resulting solution suspension was adjusted in volume to 5 ml. with dry dimethyl formamide and used without further treatment.

EXAMPLE III

To an ice cold stirring solution of 70 mg. of bovine serum albumin (BSA) (.001 mmole) in 10 cc. of water containing 0.5 g of $NaHCO_3$ was added by microsyringe a volume of the dimethylformamide solution prepared in Example II calculated to contain 0.1 mmole. After standing for four hours at 0–5° the solution was transferred to a bag for equilibrium dialysis against 4×3 liters of distilled water for six hours each change. The material remaining in the dialysis bag was yellow, evidencing the covalent link to the diazosulfonate containing compound through a p-carboxamide linkage. Further evidence for this linkage was obtained by photolysis of the BSA conjugate in basic solution in the presence of β-naphthol. Irradiation for 30 minutes with visible light from a slide projector with a 500 watt tungsten lamp and a 390 nm. cut-off filter gave a red solution. The solution remained red after equilibrium dialysis as above indicating diazonium coupling of BSA to β-naphthol.

EXAMPLE IV

A solution of 100 mg. (.0069 mmoles) of lysozyme in 10 cc. of water was adjusted to ph 9.5 with .05 N NaOH. After cooling to 0° a volume of stock dimethylformamide solution of Example II calculated to contain .05 mmoles was added dropwise with stirring. The pH was maintained at 9.3 to 9.5 throughout the addition by adding .05 N NaOH. After addition was complete, the pH remained stable for one hour at 0°. The pH was then adjusted to 7.5 and the cloudy solution was centrifuged. The supernatant was dialyzed against 4 portions of 3 liters of water for 6 hours each change. The precipitate was dissolved in 8 m. urea and likewise dialyzed. Each dialysis resulted in a yellow clear solution. The redissolved material was centrifuged again to remove a small amount of insoluble material. Either solution could be irradiated at pH 9 in the presence of excess β naphthol to give a red solution. The red color could not be removed by extensive equilibrium dialysis. Both solutions were found to contain active lysozyme when assayed using the normal procedure of measuring the rate of clearing of a suspension of lyophilized bacteria.

EXAMPLE V

A stock, buffered solution of morphine was prepared by dissolving 15 mg. of morphine in 7.5 cc. of 0.2 N sodium carbonate, then diluting to 10 cc. volume with 0.2 N sodium bicarbonate. The final pH was 10.3. To 4 cc. of this solution was added 400 μl. of a $\sim 2 \times 10^{-4}$ M lysozyme conjugate solution of Example IV. The final concentration of morphine was $5 \times 10^{-3}$ M and that of lysozyme conjugate was $\sim 2 \times 10^{-5}$ M.

This solution was cooled and irradiated with visible light of wave length longer than 390 nm. for one-half hour. The solution was only slightly darker in color after this irradiation. The solution was dialyzed against 4 liters of distilled water in a small hollow fiber device. The solution was found to have active enzyme by lysis of a bacterial suspension. The rate was carefully measured and a clearing rate of 190 optical density units in 48 seconds was recorded. Addition of antibody to morphine reduced the rate to 140 units in 48 seconds for an inhibition of 25%. This result is indicative of photobonding of morphine to lysozyme.

EXAMPLE VI (A) To 500 mg. of disodio *para*-(*anti*-diazosulfonato) benzoate ($1.7 \times 10^{-3}$ moles) and 10 ml. of dry dimethyl formamide (DMF) cooled in an ice bath to 0° was added one ml. of isobutyl chloroformate ($7.61 \times 10^{-3}$ moles) followed by 1.5 ml. of triethylamine. The mixture was stirred for three hours at 0° followed by standing for 2 days in a cold room with stirring. Excess chloroformate and dimethylformamide were removed by rotary evaporation at 40°.

(B) The supernatant resulting from slurrying 30 mg. of insulin with 0.25 M sodium bicarbonate was combined with 50 λ ($6.85 \times 10^{-3}$ mmoles) of the anhydride prepared above. The mixture was stirred for 2.5 hours at 4°, at the end of which time, the solution was dialyzed against pH 8.8 tris-barbital buffer.

The above solution was then combined with 0.25 ml. (10 mg./ml. $3.4 \times 10^{-5}$ mmoles) of dialyzed malate dehydrogenase (dialyzed against tris-barbital buffer, pH 8.8) and the solution irradiated with visible light (greater than 398 nm.) for approximately 45 minutes. A small sample was combined with β-naphthol, the solution turning red, indicating that all the diazosulfonate had not reacted.

The resulting product was chromatographed through a column of Sephadex G–50 swelled with tris-barbital, pH 8.8 buffer. Five λ of the solution had an activity when assayed for malate dehydrogenase of about .12 OD/min.

EXAMPLE VII

Employing the mixed anhydride of Example VI, to 100 λ of the mixed anhydride solution was added 1 ml. of dialyzed malate dehydrogenase at 4°.

After 2.5 hours of stirring at 4°, the mixture was dialyzed against tris-barbital buffer, pH 8.8. To the malate dehydrogenase conjugate, was added 30 mg. ($5.23 \times 10^{-3}$ mmoles) of insulin in 1.5 ml., which had been centrifuged to remove any insoluble material. The mixture was irradiated for one hour and 15 minutes, then cooled for one hour, irradiated for another half hour, and then chromatographed through Sephadex G–50. The yellow band which came off the column had no enzyme activity, although it is believed conjugation occurred. The result of conjugation was apparently to deactivate the enzyme.

EXAMPLE VIII (A) To stirring, ice cold solution of 3.0 g. (16.2 mmoles) of 4-aminophenoxy acetic acid monohydrate (Jacobs et al., J. Am. Chem. Soc., *39*, 1436 (1917)) in 100 ml. of water and 6 ml. of concentrated HCl was added at once a solution of 1.12 g. (16.2 mmoles) of sodium nitrite in 10 ml. of cold water. After 15 minutes at 0°, a few milligrams of the starting amino acid was added, and a negative test for nitrous acid was then obtained. The pH was adjusted from 1.5 to 3 with saturated aqueous sodium acetate and 2.04 g. (16.2 mmoles) of sodium sulfate in 20 ml. of water was added. After storing the solution overnight, at 0°–5° in the dark, a test with paper moistened with basic $\beta$-naphthol was negative. The orange reaction mixture was decolorized with charcoal to obtain a canary yellow solution and the product precipitated by saturating the solution with potassium bromide. Yield: 5.0 g.

(B) To a stirring ice-cold suspension/solution of 324 mg. of the above product in 15 ml. of dry dimethyl formamide (DMF) was added 1 ml. of isobutyl chloroformate followed by 1 ml. of dry triethyl amine. After stirring for one hour, at ice temperature, followed by one hour at room temperature, the mixture was filtered under dry nitrogen and evaporated *in vacuo* (0.1 mm. Hg) at 40° to a 5 ml. volume. The solution was diluted with DMF to 10 ml. and stored in the dark at 0°–5° C.

(C) To a stirring, ice cold solution of 70 mg. of bovine serum albumin in 10 ml. of water containing 0.5 g. of sodium carbonate was added dropwise 1 ml. of the above prepared diazosulfonate mixed anhydride. (The mole ratio of anhydride to bovine serum albumin was 100/1.) The reaction mixture was then refrigerated in the dark for 36 hours, transferred to a dialysis bag, and dialyzed against three 3 l. portions of distilled water. Light was excluded during the operations. The residual solution was 15 ml. which gave a positive test with basic $\beta$-naphthol upon exposure to light. The solution was diluted to 25 ml. to provide an approximately $10^{-5}$ M solution of the diazosulfonate derivative of bovine serum albumin.

(D) One ml. of the above solution (approximately $10^{-5}$ M) was diluted to 5 ml. with a solution prepared by dissolving 52 mg. of amphetamine sulfate, 105 mg. of sodium carbonate and 84 mg. of sodium bicarbonate in 10 ml. water to provide a final solution of pH 9.7, $1.4 \times 10^{-2}$ M in amphetamine. The solution was irradiated in the diffuse light of a 500 watt slide projector for 0.5 hours. The solution was then transferred to a dialysis bag and dialyzed against three 3 l. portions of distilled water. The presence of the amphetamine moiety in the residue in the dialysis bag was established by an assay technique, demonstrating that amphetamine was bound to the bovine serum albumin in a covalent manner.

The above examples demonstrate that various compositions or compounds, particularly poly(amino acid) compositions can be conjugated under very mild conditions. Furthermore, enzymes can be conjugated to other proteins, or polypeptides under relatively mild conditions without substantial formation of polymeric material. Furthermore, the *anti*-diazosulfonate, provides, in effect, a reactive group on demand. That is, one can conjugate a compound or composition with the *anti*-diazosulfonate derivative and store the composition for relatively long periods of time. When it is desirable to conjugate the *anti*-diazosulfonate to another molecule so as to bond the first molecule to the second molecule, one need merely combine the preformed reagent with the second molecule and irradiate.

The subject method avoids the disadvantages of prior methods which were substantially concerned when crosslinking proteins or polypeptides with difunctional molecules having the same functionality. In those cases, where A and B where the two compounds, one had to separate A—A and B—B from the desired A–B with substantial loss of material, and be frequently dependent for the separation upon differences in molecular weight between A and B. Furthermore, polymeric A or B could contaminate the A–B mixture and might be only difficultly separable. In addition, the ratio of A and B in any one molecule was relatively uncontrolled.

Although the foregoing invention has been described in some detail by way of illustration and example for purposes of clarity of understanding, it will be obvious that certain changes and modifications may be practiced within the scope of the appended claims.

What is claimed is:

1. Method for linking a first polyfunctional compound with a second compound, wherein said first compound is a polypeptide having a plurality of functionalities capable of reacting with at least one common functionality, and said second compound has at least one group capable of reacting with a light activated diazosulfonate comprising:
    reacting said first compound with a substituted aryldiazosulfonate, having a substituent other than a diazo group which reacts with at least one of the functionalities of said first compound, in a sufficient amount to provide a product having the desired degree of substitution and obtaining a diazosulfonate substituted first compound;
    combining said diazosubstituted first compound with said second compound in the presence of sufficient light to activate the diazosulfonate to maintain a relatively low concentration of reactive diazosulfonate, wherein the reactive diazosulfonate reacts with said second compound to provide a compound having at least one of said second compound linked to one of said first compound.

2. A method according to claim 1, wherein said substituted aryldiazosulfonate is a non-oxo carbonyl substituted benzene diazosulfonate.

3. A method according to claim 1, wherein said first compound has a molecular weight in the range of about 125 to 10 million.

4. A method according to claim 3, wherein said first compound has a molecular weight in the range of 125 to 500,000.

5. A method for joining first and second polyfunctional compounds, wherein the said first polyfunctional compound is a polypeptide and said second polyfunctional compound has at least one diazosulfonate reactive functionality capable of reacting with a light activated diazosulfonate group which comprises:
    combining said first polyfunctional compound with a substituted aryldiazosulfonate, wherein a substitutent of said substituted aryldiazosulfonate is capable of reacting with at least one of the functionalities present in said first polyfunctional compound, and is other than a diazo group, under conditions wherein at least one of said substituted aryldiazosulfonate becomes covalently linked by said substituent to said first polyfunctional compound to provide an aryldiazosulfonate substituted first compound;
    combining said aryldiazosulfonate substituted first compound with said second polyfunctional composition in a liquid medium to form a mixture and irradiating said mixture with sufficient light to activate said diazosulfonate and maintain a relatively low concentration of reactive diazosulfonate to react with said diazosulfonate reactive functionality to provide a product having at least one of said second polyfunctional compound bonded to said first polyfunctional compound.

6. A method according to claim 5, wherein said second polyfunctional composition is a polypeptide.

7. A method according to claim 5, wherein said substituent of said substituted aryldiazosulfonate is a non-oxo carbonyl.

8. A method according to claim 5, wherein said substituted aryldiazosulfonate is a non-oxo carbonyl substituted benzenediazosulfonate.

9. A method according to claim 5, wherein said light is of a wave length greater than 350 nm.

10. A method of linking a first polypeptide which is other than an enzyme to a second polypeptide which is an enzyme, wherein at least one of said polypeptides has at least one amino functionality, which comprises:

combining in an aqueous medium one of said polypeptides having at least one amino functionality with a mixed anhydride of carboxybenzenediazosulfonate to form a carboxamidebenzenediazosulfonate of said polypeptide;

combining said carboxamide and said other of said polypeptides in an aqueous medium and irradiating with light of wave length greater than 380 nm, to activate the diazosulfonate of said carboxamidediazosulfonate, wherein said first and second polypeptides become linked through said diazo group.

11. A method according to claim 10, wherein said irradiating is carried out at a temperature in the range of −5–50° C.

12. A method according to claim 10, wherein said first polypeptide is a hormone.

References Cited

UNITED STATES PATENTS

| | | | |
|---|---|---|---|
| 3,654,090 | 4/1972 | Schuurs et al. | 195—103.5 |
| 3,639,558 | 2/1972 | Csizmas et al. | 195—63 X |
| 3,479,183 | 11/1969 | Habib et al. | 96—91 RX |
| 3,167,485 | 1/1965 | Katchalski et al. | 195—68 |

OTHER REFERENCES

Silman et al., "Some Water-Insoluble Papain Derivatives," Biopolymers, vol. 4, 1966 (pp. 441–448) (195–Dig. 11).

DAVID M. NAFF, Primary Examiner

U.S. Cl. X.R.

195—63, DIG 11; 260—112 R, 112.5